United States Patent Office 3,306,161
Patented Feb. 28, 1967

3,306,161
PHOTOGRAPHIC APPARATUS
Albert Ernest Adams, London, England, assignor to Pictorial Machinery Limited, Crawley, England, a British company
Filed Sept. 29, 1964, Ser. No. 400,125
Claims priority, application Great Britain, Sept. 30, 1963, 38,450/63
9 Claims. (Cl. 88—24)

The invention relates to photographic apparatus.

The invention provides photographic apparatus which comprises a copyholder for holding the copy or material to be photographed by the camera, and means for moving the copyholder between a photographing position in which the copyholder is positioned for the production by the camera of an image at an imaging position, which is remote from the photographing position, of the copy held by the copyholder, and a loading position, in which the copyholder is positioned adjacent to the imaging position such that an operator positioned adjacent the imaging position to inspect the image or to place or remove photosensitive material at the image position can also load or unload the copyholder at the loading position.

Preferably the apparatus includes locating means for locating the copyholder in the photographing position accurately with respect to the camera. Preferably means is provided for effecting relative movement between the locating means and the camera, towards and away from each other, thereby to vary the magnification of the image. Preferably the aforesaid locating means comprise supporting means for supporting the copyholder at the minimum number of positions thereon to ensure its accurate location as aforesaid.

Preferably the means for moving the copyholder between the photographing position and the loading position as aforesaid is such that the said means is operable to return the copyholder automatically to the photographing position defined by the locating means regardless of the position of the locating means relative to the camera over the range of relative movement as aforesaid. Preferably the means for moving the copyholder comprises a first member coupled thereto, which apparatus also comprises a second member coupled to the camera and the locating means for movement corresponding to the said relative movement therebetween, the first and second members being coupled together so that relative movement between the camera and the locating means adjusts the movement of the copyholder-moving means to return the copyholder to the locating means as aforesaid.

Preferably the first member is adapted to move pivotally about a pivot position to move the copyholder as aforesaid between the photographing and loading positions, and this movement is adjusted as aforesaid by altering the radius of the copyholder from the pivot position.

Preferably relative movement between the camera and locating means causes corresponding relative movement between the pivot position and the locating means, and the arrangement is such that the radius is altered as aforesaid to maintain the copyholder and the locating means substantially equidistant from the pivot position, at least as the copyholder approaches the locating means.

Preferably the pivot position is provided by a rotatable member, with the periphery of which the first member engages for movement tangential thereto, the arrangement being such that rotation of the rotatable member about its axis, relative to the first member causes tangential movement of the first member and consequent alteration of the radius of the copyholder from the pivot position.

Preferably the second member engages a second rotatable member coupled to the first rotatable member for rotation therewith, whereby movement of the second member causes rotation of the first rotatable member.

Preferably the second rotatable member is adapted to roll along a fixed member in relation to the camera, between the second member and the fixed member and the first and second rotatable members are also coupled together for rolling movement together along the fixed member, whereby movement of the second member with respect to the fixed member also causes movement of the pivot position with respect to the camera.

Preferably the means for moving the copyholder includes means for rotating the first member about the pivot position, which rotating-means is carried by the rotatable members for movement therewith along the fixed member.

Preferably power means are provided for moving the copyholder as aforesaid. Preferably automatic control means are provided for automatically controlling the power means to cease moving the copyholder when it reaches the photographing position of the loading position. Preferably there is provided further control means, positioned for operation by an operator positioned as aforesaid, for initiating movement of the copyholder as aforesaid.

The invention also provides photographic apparatus incorporating a camera, and a device for modifying the tonal rendering of a photograph taken by the camera, which comprises means for introducing illumination into the camera to substantially uniformly illuminate the photosensitive surface in the camera for a brief period.

A specific embodiment of the invention will now be described by way of example and with reference to the accompanying drawings in which.

Figure 1:
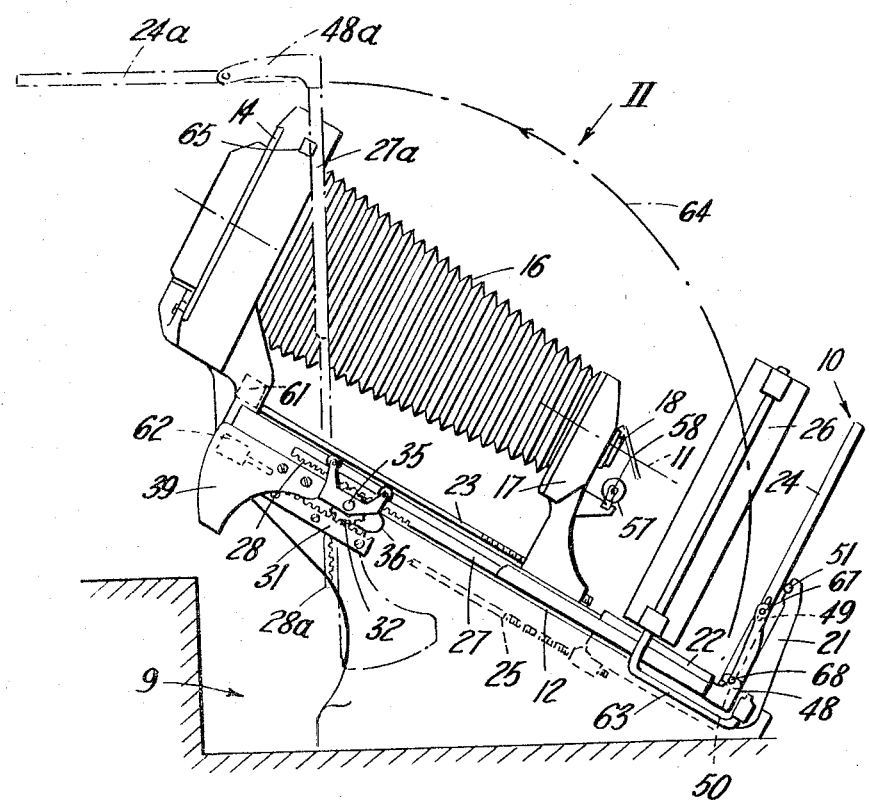
FIGURE 1 is a side elevation of a process camera, partly in section.

The camera in this example is about six feet long and mounted with its optical axis 11 inclined. The camera is mounted on a rigid sloping bed 12, the lower end of the camera being accommodated in a well 9 below the level of the floor of the room in which the apparatus is installed.

The upper end of the camera comprises an image frame 13 which is secured to the sloping floor 12. This image frame carries a holder for photosensitive material in an image position 14 at the upper end of the camera and in a plane perpendicular to the optical axis 11. The image frame 13 is provided with a door 15 through which the image may be inspected on a ground-glass screen, and the screen replaced by photosensitive material.

A lightproof bellows 16 is secured at one end to the image frame 13 and extends towards the lower end of the camera. The lower end of the bellows is secured to a lens carriage 17 which carries a lens 18. A cylindrical tubular guide 20 runs parallel to and below the optical axis 11 and is secured at each end to the bed. This guides and supports the lens carriage 17, and also guides a copyholder cradle 21. The cradle 21 is secured to a sleeve 22 which is a close sliding fit on the guide 20. The copyholder cradle provides locating means for the copyholder in the photographing position. The lens carriage 17 can be moved along the tubular guide by means of a lens carriage lead screw 23 parallel thereto. An electric motor 61 is provided to rotate this lead screw, and a control switch for the motor is provided on a control panel adjacent the image frame 13 in a position convenient for operation by the operator. A lead screw 25 is provided to move the copyholder cradle 21 parallel to the optic axis guided by tubular guide 20. (For the sake of clarity of illustration the lead screws 23 and 25 are shown slightly out of position in FIGURE 1.) An electric motor 62 is provided to turn lead screw 25 and a control switch is provided for this motor on the aforesaid panel. By this means the photographing position of the copyholder may be moved towards and away from the image position. By adjusting the relative position of the copyholder cradle and lens carriage, the magnification of the image with respect to the copy and the focus of the image can be adjusted.

Lamps 26 are provided on each side of the optical axis to illuminate the copy on the copyholder 24 in the photographing position 10. The lamps are attached to the copyholder cradle 21 by means of swinging arms 63 so that they can remain in a fixed position with respect to the photographing position as the latter moves.

The copyholder can be moved between the photographing position 10 and a loading position indicated by 24a in FIGURE 1. To this end the copyholder is supported on two copyholder support members provided by rigid bars 27 each having a rack 28 on the underside at the rear end and each secured to one side of the copyholder. The bars 27 are arranged to pivot about a pivot position provided by the axis 35 of a shaft 34.

Two members coupled between the copyholder cradle and the camera are provided by two rigid bars 29 secured one to each side of the copyholder cradle 21, and each having a rack 30 on its underside at the rear end. The bars 27 and 29 are parallel when the copyholder is in the photographing position, and the teeth of the racks 28 and 30 are the same size.

Secured to the bed 12, below and parallel to racks 28 and with teeth of the same size, are two further fixed racks 31. Engaging in each adjacent pair of racks 28 and 30 on each side of the camera are pinions 32 and 33. The pinions 33 also engage in the fixed racks 31, respectively. The pinions 32 and 33 are keyed to the shaft 34 which rotates about the axis 35 below the level of the sloping bed 12, under the camera. The shaft 34 is free to move longitudinally of the bed in a slot 36 in the bed. Secured to, but slidable along, each bar 27 is a frame 37 attached to which is an internally toothed gear wheel 38 concentric with axis 35, and a counter weight 39. Mounted eccentrically inside the gearwheel 38 is a pinion 40, and attached to pinion 40 is a link 41 which prevents the pinion 40 from rotating. The link is pivoted at 47 and 47a so that it permits orbital movement of the pinion 40 within the gearwheel 38 about the axis of the gearwheel 38. Inside the shaft 34 and free to rotate within it round the same axis 35 is another shaft 42. Mounted on shaft 42 is an eccentric 43 on which the pinion 40 is mounted for free rotation.

The above described rack, pinion and gear arrangement is provided on each side of the camera. On the left-hand side of the camera, the shaft 42 is extended to accommodate a worm wheel 44 (shown in FIGURE 3) rotated by worm 45 which is driven by an electric motor 46 secured to the frame 37. A control switch to initiate actuation of the motor, is provided for the motor 46, on the aforesaid control panel.

The arrangement is such that, when the operator starts the electric motor 46, the worm 45 turns the worm wheel 44, which rotates the eccentric 43. Rotary movement of the eccentric about the axis 35 causes the pinion 40 to gyrate orbitally inside gearwheel 38. The gear ratio between the gears 40 and 38 is dependent on the number of teeth on each wheel, and is a non-unity ratio as there are more teeth in gear 38 than in gear 40. Gearwheel 38 is thus caused to rotate and, by means of the frame 37, move the bar 27 in a clockwise direction (as viewed in FIGURE 3), thus moving the copyholder 24 from the photographing position defined by the cradle 21, along the path 64, position 24a, which is conveniently near to the image frame 13 for the operator to change the copy.

As described above, the copyholder cradle 21 may be moved parallel to the optic axis so as to adjust magnification and focus of the image, in conjunction with suitable movement of the lens carrier. When the copyholder 24 is in the photographic position and the copyholder cradle 21 is moved along the tubular guide 20, the bars 27 and 29 will move through the same distance, as the copyholder moves with the cradle 21. This movement is translated through the racks 28 and 30 to the pinions 32 and 33, which rotate and roll along the racks 31 through half the distance moved by the cradle.

Should the operator wish to move the copyholder cradle 21 whilst the copyholder 24 is in the loading position 24a, it will be seen that such movement of the copyholder cradle will move the bars 29 and racks 30 parallel to the optical axis 11, and this will rotate the pinion 33 along the rack 31, as above described. As pinion 32 is keyed to the same shaft as 33, it will also be caused to rotate and translate its movement to the rack 28 and bar 27, which will move slidably inside the frame 37 and cause the copyholder position 24a to move the same distance as the copyholder cradle 21 has been moved. Thus the radius of the copyholder about the pivot position 34 is altered in accordance with the distance between the pivot position and the cradle. It follows that when the copyholder is again returned to the photographing position 24, by reversing the electric motor 46 and the process described above for lifting it, the copyholder cradle will be accurately placed to receive it.

In order to switch off the copyholder transport motor 46 when the copyholder reaches either the photographing position or the loading position, there are provided two microswitches. One 65 is mounted on the edge of the image frame 13 and is operated by the bar 27 when the copyholder reaches the loading position. The other 66 is mounted on the cradle 21 and is actuated by the bottom of the copyholder when it seats in the cradle.

When the frame 21 is moved with the copyholder in the loading position, the shaft 34 moves down the rack 31 but the bar 27 moves upwards so that the copyholder merely moves slightly upwards and forwards, still within the operator's reach.

The copyholder is loosely supported on a frame 48 by a pair of pins 67, 68 secured to each side of the holder, which engage in elongated slots 49 and 50 in the frame. The accurate locating means for the copyholder in the photographing position includes two cylindrical rests 51 having horizontal axes perpendicular to the camera optic axis and carried one on each side of the cradle 21 which engage the back of the copyholder part of the way up it. It also includes two cylindrical rests 52 and 53 with axes parallel to the optic axis. Further, at one end of the base of the copyholder 24 is secured an inverted V-back 54, each face of the V abutting the cylindrical surface of the rest 53 tangentially thereof. At the other end of the base of the copyholder is secured a rigid pad with a flat surface 55 for abutting the cylindrical surface of the rest 52. An adjustable screw stop 56, mounted on the copyholder cradle, and engaging with the front of the bottom of the copyholder, ensures that the copyholder comes to rest perpendicular to the optical axis about the axis of the rest 51.

Figure 2:
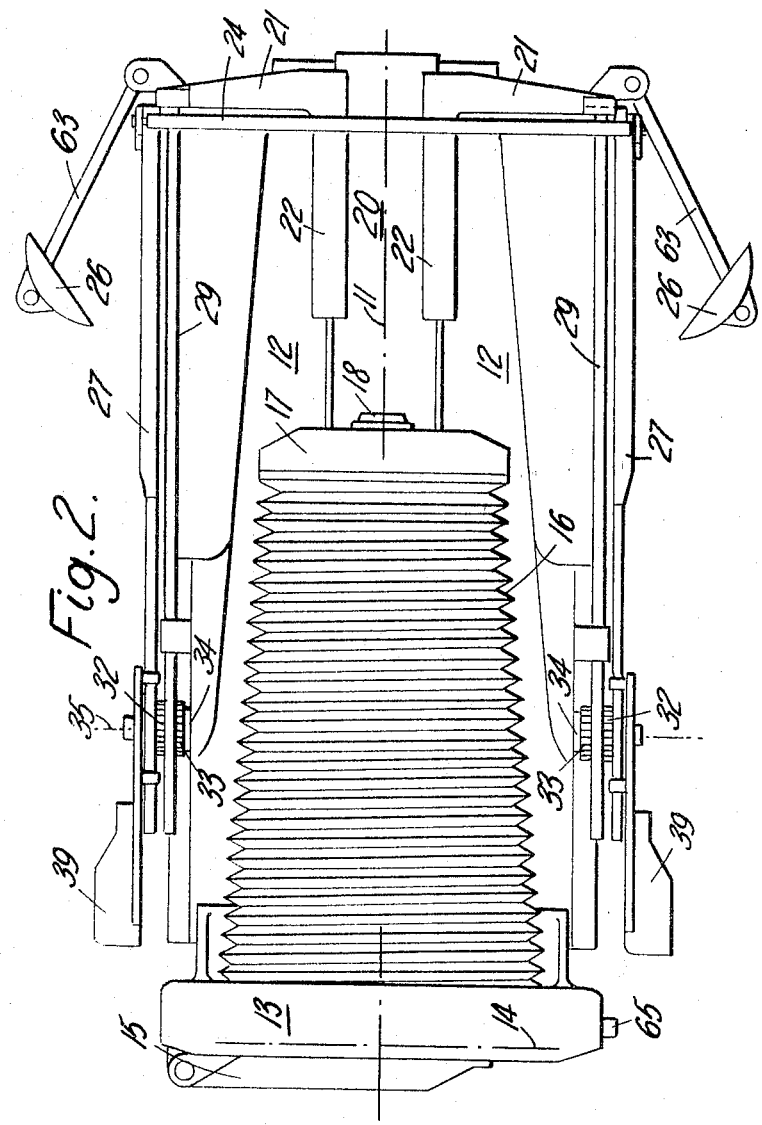
FIGURE 2 is a plan view of the camera from above, in the direction of the arrow II shown in FIGURE 1.
Figure 3:
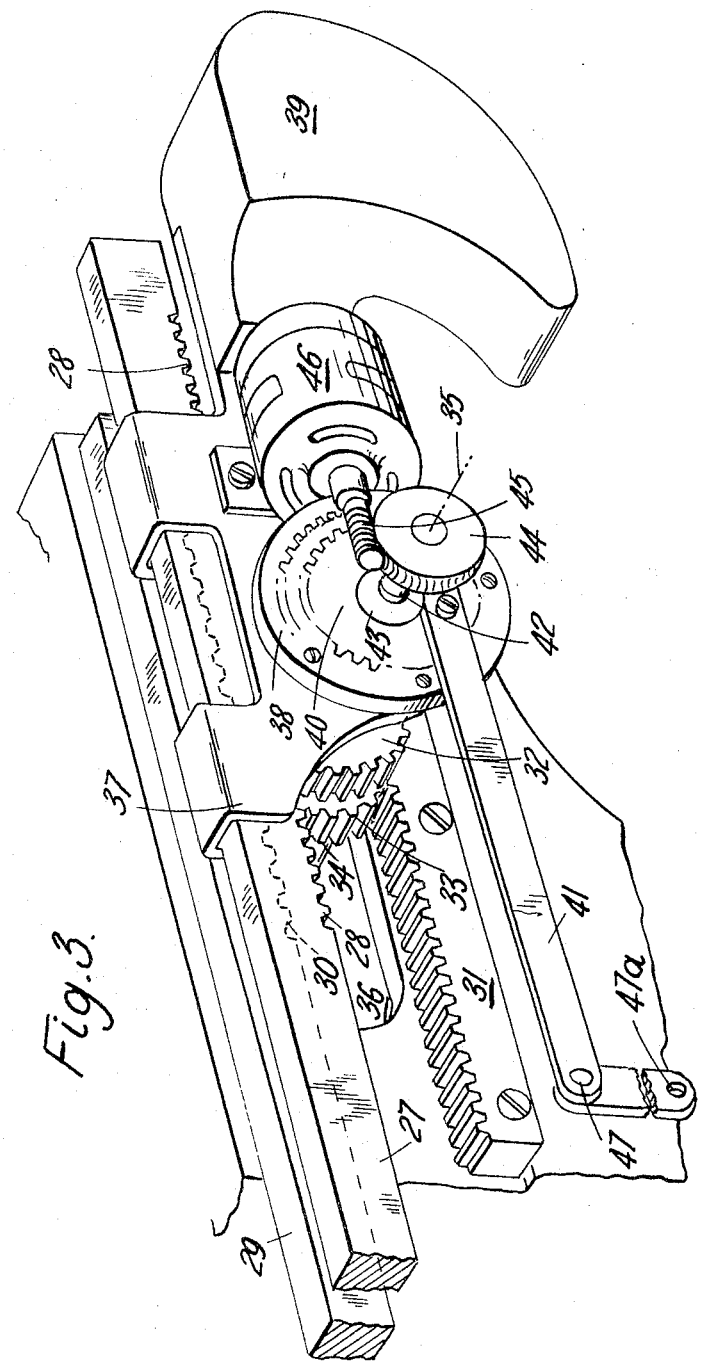
FIGURE 3 is a perspective view of the mechanism for elevating the copyholder, on the side of the camera remote to that shown in FIGURE 1.
Figure 4:
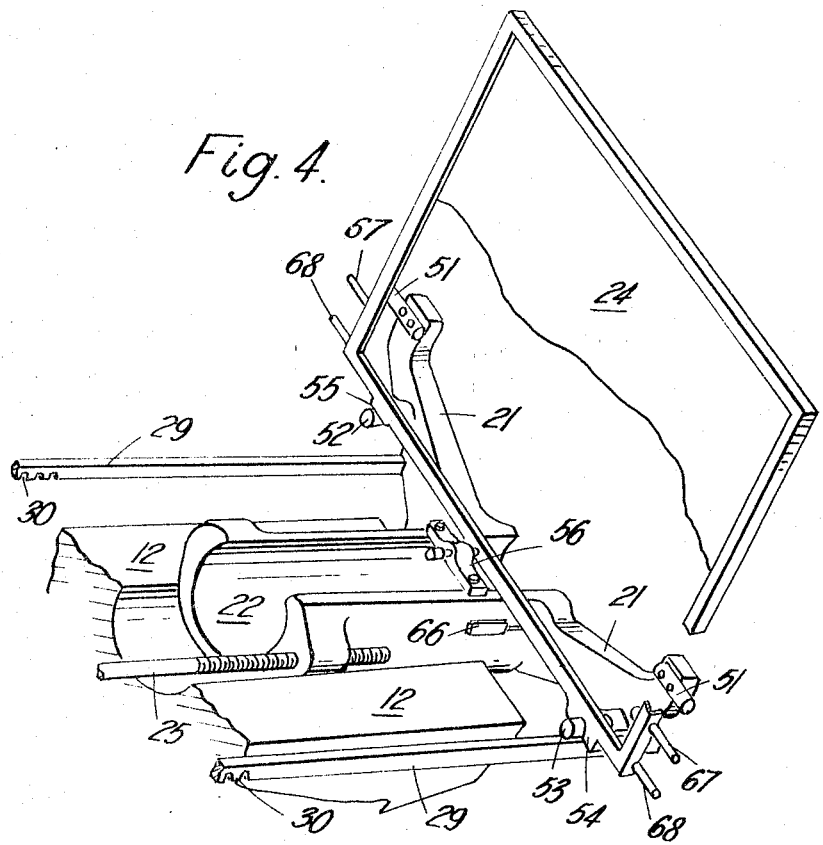
FIGURE 4 is a perspective view of the copyholder and cradle, partly in section, showing the locating means.

When the copyholder is urged against the supporting means (as is illustrated in FIGURES 1, 2, and 3) by the force of gravity on the copyholder exerting a turning moment about the two cylindrical rests 51, the copyholder is positively located against movement relative to the cradle 21. The cylindrical rest 53 abutting the V-block 54 prevents translational movement in a horizontal direction perpendicular to the optical axis. The combination of the rest 53 abutting the V-block 54, the cylindrical rest 52 abutting the flat surface 55 and the action of gravity prevent translational movement in a vertical direction perpendicular to the optical axis. The combination of the rests 51 abutting the copyholder 24 and the adjustable stop 56 acting on the base of the copyholder and the action of gravity on the copyholder prevent movement parallel to the optical axis and also rotational movement about a horizontal axis perpendicular to the optical axis. The combination of the rest 53 abutting the V-block 54, the rest 52 abutting the flat surface 55 and the action of gravity prevent rotation of the copyholder about the optical axis.

The photographic apparatus of this example includes a device for modifying the tonal rendering of a photograph taken by the camera, which comprises means for introducing illumination into the camera to substantially uniformly illuminate the photosensitive surface in the camera for a brief period.

The device comprises a light source in the form of an electric lamp 57 and a transparent reflector 58 (i.e. a partial reflector) in front of the lens 18. This transparent reflector, without impeding the rays of light from the copy, reflects light from the source through the lens into the camera.

The photographic process camera of the foregoing example is advantageous in that it provides for the copyholder to be brought to hand of the operator for changing copy, and then return to the photographing position for the next exposure, without the need for the operator to walk from one end of the camera to the other. Furthermore, the copyholder is automatically accurately located with respect to the camera on return to the photographing position. Further, the position of the photographing position, relative to the camera, may be altered while the copyholder is in the loading position, or in transit, but the copyholder will still be returned to, and accurately located in, the photographing position.

The invention is not restricted to the details of the foregoing examples.

I claim:

1. Photographic apparatus comprising a camera, a copyholder for holding material to be photographed by the camera, locating means for locating the copyholder in a photographing position, means for effecting relative movement between the locating means and the camera to vary the magnification of the photographic image, pivotally mounted supporting means supporting the copyholder, pivoting means operable from a position adjacent the imaging position of the camera to pivot the supporting means and thereby move the copyholder from the locating means to a loading position in which the copyholder is adjacent the said imaging position, and means for adjusting the pivotal mounting of the supporting means in dependence on relative movement between the locating means and camera whereby the copyholder on return to the photographing position engages with the locating means regardless of relative movement between the locating means and camera while the copyholder was in the loading position.

2. Apparatus as claimed in claim 1, in which the means for adjusting the pivotal mounting of the copyholder supporting means moves the pivot point relative to the locating means when relative movement is effected between the locating means and the camera, and maintains the radius of the copyholder from the pivot point equal to the distance between the pivot point and the locating means.

3. Apparatus as claimed in claim 2, in which the locating means is secured to a rack engaging a rotary member at the pivot point whereby the pivot point is moved as the locating means is moved.

4. Apparatus as claimed in claim 3, in which the copyholder supporting means includes a rack engaging a first pinion at the pivot point, said first pinion adapted to rotate as the locating means is moved to thereby move the copyholder supporting means tangential to said first pinion to alter the radius of the copyholder from the pivot point.

5. Apparatus as claimed in claim 4, in which the copyholder supporting means is slidably mounted in a bracket member at the pivot point and said pivoting means includes means for rotating the bracket about said first pinion to thereby rotate the copyholder supporting means from the photographing position to the loading position.

6. Apparatus as claimed in claim 5, in which said rotary member comprises a second pinion co-axially secured for rotation with said first pinion.

7. Apparatus as claimed in claim 5, in which said pivoting means includes a power drive mounted for movement with said bracket member.

8. Apparatus as claimed in claim 7, including first power means operable from adjacent the imaging position for moving said locating means.

9. Apparatus as claimed in claim 8, including second power means operable from adjacent the imaging position for moving said camera lens carriage.

References Cited by the Examiner
UNITED STATES PATENTS 1,995,252  3/1935  Keinert et al. _____ 88—24 X
2,621,569  12/1952  Glassey _____ 88—24

NORTON ANSHER, *Primary Examiner.*

R. A. WINTERCORN, *Assistant Examiner.*